(12) United States Patent
Kronberger et al.

(10) Patent No.: US 11,701,744 B2
(45) Date of Patent: Jul. 18, 2023

(54) METHOD FOR CONNECTING A FIRST COMPONENT TO A SECOND COMPONENT TO FORM AN ASSEMBLY

(71) Applicant: Miba Sinter Austria GmbH, Laakirchen (AT)

(72) Inventors: Dominik Kronberger, Vorchdorf (AT); Markus Schauer, Gunskirchen (AT); Karl Dickinger, Vorchdorf (AT); Andreas Tiefenthaler, Vorchdorf (AT)

(73) Assignee: Miba Sinter Austria GmbH, Laakirchen (AT)

( * ) Notice: Subject to any disclaimer, the term of this patent is extended or adjusted under 35 U.S.C. 154(b) by 0 days.

(21) Appl. No.: 17/500,072

(22) Filed: Oct. 13, 2021

(65) Prior Publication Data

US 2022/0152755 A1    May 19, 2022

(30) Foreign Application Priority Data

Nov. 17, 2020   (AT) .............................. A 51003/2020

(51) Int. Cl.
*B23P 19/02*   (2006.01)
*B23P 11/02*   (2006.01)
*B23P 15/14*   (2006.01)

(52) U.S. Cl.
CPC ............. *B23P 19/02* (2013.01); *B23P 11/025* (2013.01); *B23P 15/14* (2013.01); *Y10T 29/49465* (2015.01)

(58) Field of Classification Search
CPC ......... B23P 11/025; B23P 11/00; B23P 15/14; B21D 39/06
See application file for complete search history.

(56) References Cited

U.S. PATENT DOCUMENTS

| 9,546,725 B2 * | 1/2017 | Taniguchi ............... F16H 55/17 |
| 2007/0271789 A1 | 11/2007 | Kondo |
| 2018/0080538 A1 | 3/2018 | Gebhart et al. |
| 2019/0145461 A1 | 5/2019 | Karlsberger et al. |

FOREIGN PATENT DOCUMENTS

| DE | 196 27 454 A1 | 1/1998 |
| DE | 10 2017 008 835 A1 | 3/2018 |
| DE | 10 2018 008 529 A1 | 5/2019 |
| JP | 2009-242821 A | 10/2009 |
| JP | 2017-066491 A | 4/2017 |
| WO | 2011/147755 A1 | 12/2011 |
| WO | 2016/021362 A1 | 2/2016 |

* cited by examiner

*Primary Examiner* — Christopher J Besler
(74) *Attorney, Agent, or Firm* — Collard & Roe, P.C.

(57) ABSTRACT

A method for connecting a first component to a second component to form an assembly forms a press fit connection between the first component and the second component, for which purpose the second component is produced having an annular component section. A recess is formed, in which the first component is at least partially arranged. At least the annular component section of the second component is produced as a sintered component and has net shape or near net shape quality at least in the region of the recess.

6 Claims, 2 Drawing Sheets

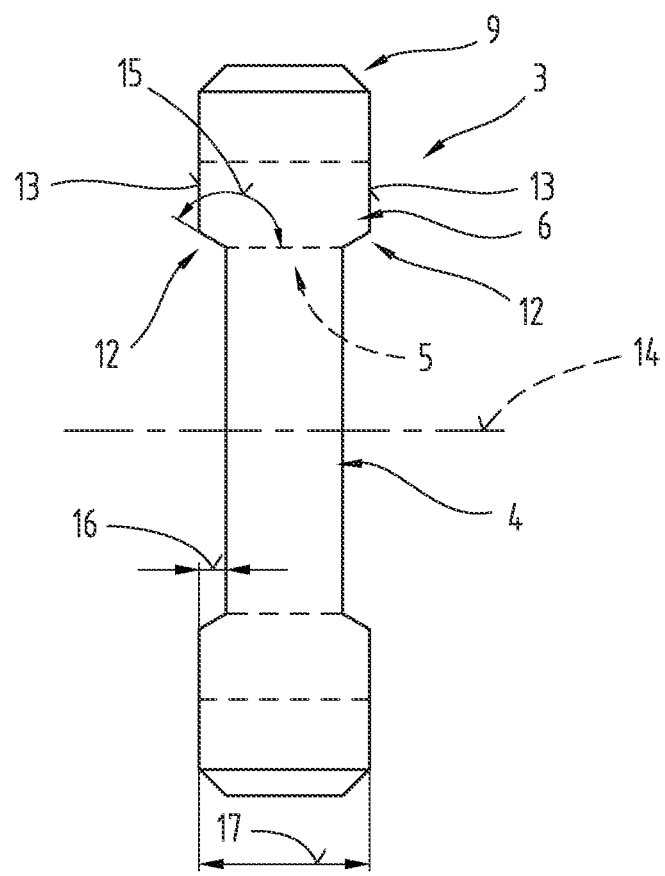
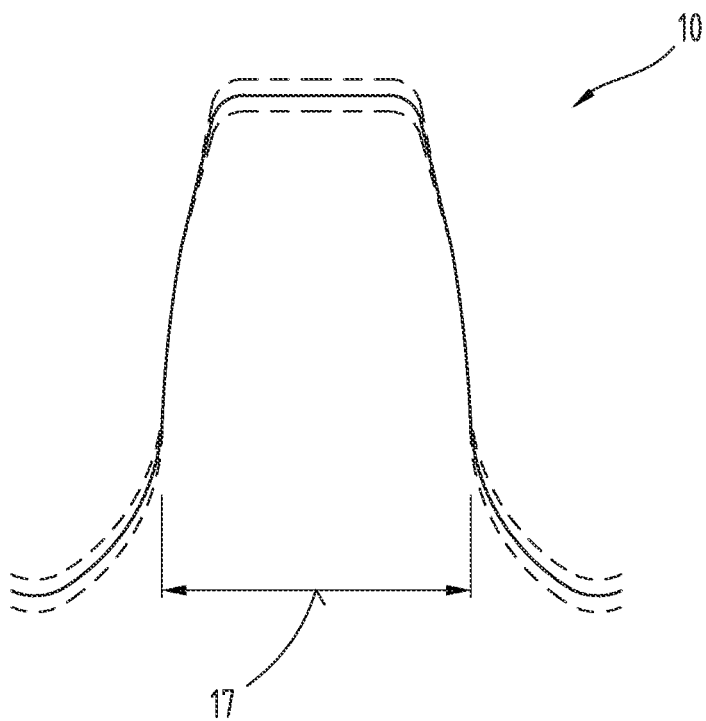

METHOD FOR CONNECTING A FIRST COMPONENT TO A SECOND COMPONENT TO FORM AN ASSEMBLY

CROSS REFERENCE TO RELATED APPLICATIONS

Applicant claims priority under 35 U.S.C. § 119 of Austrian Application No. A51003/2020 filed Nov. 17, 2020, the disclosure of which is incorporated by reference.

BACKGROUND OF THE INVENTION

1. Field of the Invention

The invention relates to a method for connecting a first component to a second component to form an assembly, wherein a press fit connection is formed between the first component and the second component, for which purpose the second component is produced having an annular component section, in which a recess is formed, in which the first component is at least partially arranged.

Moreover, the invention relates to an assembly comprising a first component and a second component, wherein a press fit connection is formed between the first component and the second component, for which purpose the second component has a recess, which is formed in an annular component section and in which the first component is at least partially accommodated.

Additionally, the invention relates to a gear comprising an annular component section, which has an outer lateral surface, on which an external toothing is formed.

2. Description of the Related Art

Press fits between two components are a known connecting method in mechanical engineering, used particularly in the area of shaft-hub connections. For example, DE 196 27 454 A1 describes a method for joining components by means of a press fit with the aid of a press ram under the influence of a joining force due to a joining stroke, wherein the joining surfaces of the joining partners are joined to one another with a slight inclination during the insertion phase, and subsequently, the inclination is reverted immediately after the insertion phase in the first stage of the press-in phase, wherein the inclination is tolerated below the threshold value considered damaging for the material pairing.

From WO 2011/147755 A1, it is known that circular saw blades and similar tools are adapted to the shafts of the processing and grinding machines by means of finely tolerated fits. By selecting the tightest possible fit, the necessary concentricity of the tools is guaranteed. This requires adhering to very tight production tolerances for tool bores and shafts. For a zero-clearance accommodation of the tool, it is thus suggested in this WO-A1 document that the tools receive openings in the region of the hub, so that parts of the hub themselves exert a spring effect onto the shaft and thus, cause a mechanically pretensioned centering when attaching the saw blade to the shaft. For this purpose, the hub of the tool is designed such that the hub in a relaxed state has an undersize and thus, a press fit is formed. Due to the spring effect of the hub design, the tool can still be easily joined to the shaft and displaced thereon by hand. In this regard, the spring effect centers the tool, whereby the concentricity is improved.

In the case of gears, the inner diameter has traditionally either been turned, milled or ground in order to thus obtain tolerances of less than 30 µm. This additional working step of mechanical processing of the gear in the region of the inner diameter makes creating such press fits more expensive.

SUMMARY OF THE INVENTION

The underlying object of the present invention is to simplify the production of a press fit. In particular, it is the object of the invention to make the formation of the concentricity of an assembly with a press fit more cost-effective.

The object of the invention is achieved by the initially mentioned method, in which it is provided that at least the annular component section of the second component is produced as a sintered component and having net shape or near net shape quality at least in the region of the recess.

Moreover, the object of the invention is achieved in the initially mentioned assembly in that at least the annular component section of the component is a net shape or a near net shape sintered component at least in the region of the recess.

Furthermore, the object of the invention is achieved with the initially mentioned gear, in which the teeth of the external toothing make allowance for the average expansion of the tooth root chord.

In this regard, it is advantageous that by designing the annular component section as a sintered component, the radial height of said section can be produced with a relatively high accuracy. This way, for example gears can be produced relatively easily and with that more cost-effectively with a very uniform distance between the tooth root circle and the inner diameter, meaning from the inner lateral surface defined by the inner diameter. Even if greater tolerances of the inner diameter and roundness occur, they can be compensated more easily in the case of sintered components by pressing onto a shaft with a circular cross-section. Thus, a mechanical processing, particularly machining, of the inner lateral surface of the annular component section is not required, so that this sintered component section, and preferably also the entire second component, can be produced having net shape or near net shape quality. Due to the sintered material being plasticizable in the creation of the press fit, the surfaces of the two components can better adapt to one another, so that the bond strength can be improved and thus, the continuous frictional load can be reduced. Hence, the force fit is not designed for safety against plastic deformation. When joining the force fit, the sintered material may also be compressed at the inner diameter.

According to an embodiment variant of the invention, it may be provided that the annular component section is produced and/or formed having a radial wall thickness W, that moreover the recess is produced and/or firmed having a circular cross-section and an inner diameter D, wherein the radial wall thickness W is produced and/or formed such that a ratio W/D<1/2. By applying this geometrical condition for the annular component section, the formation of the press fit when arranging the second component on the first component can be improved.

As mentioned above, the method is also particularly suitable for connecting a gear to a shaft, for example a crankshaft, due to the simpler generation of the concentricity accuracy, so that, according to a further embodiment variant of the invention, it may be provided that the second component is produced as a gear, for which an external toothing is formed on an outer lateral surface of the annular component section.

According to a different embodiment variant of the invention, it may be provided, for further simplification of the installation of the second component on the first component, that the annular component section is formed having a chamfer on the circumference of the recess at the transition between the inner lateral surface bounding the recess and an end face of the annular component section. In this regard, this chamfer can be pressed during the powder-metallurgical production of the annular component section without mechanical processing of the second component.

For further improving the installation of the second component on the first component, it may be provided according to an embodiment variant of the invention that the chamfer is formed with an angle to the inner lateral surface bounding the recess of the annular component section, which angle is selected from a range of 170° to 178°.

For better adapting the concentricity accuracy of the second component (the gear) to the concentricity accuracy of the first component (the shaft), it may be provided according to an embodiment variant of the invention that the average expansion of the tooth root chord is made allowance for in the external toothing.

For further improving the formation of the force fit, it may be provided according to a different embodiment variant that the sintered component is produced having pores with an average pore size in the range of 5 μm to 200 μm.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 3 shows an embodiment variant of a component; and

FIG. 4 shows a cutout from a gear.

DETAILED DESCRIPTION OF PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
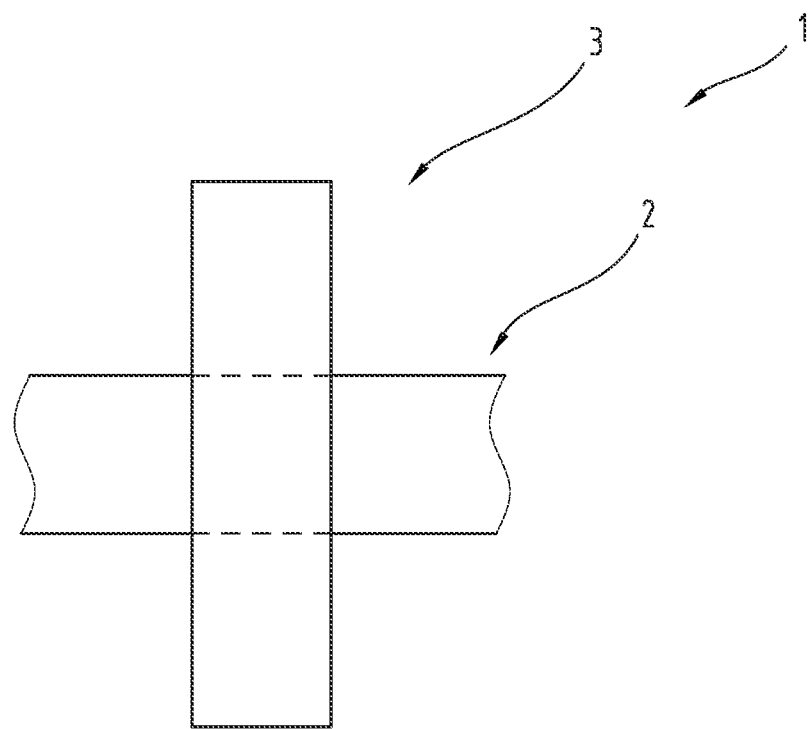
FIG. 1 shows an assembly comprising two components connected to one another, in a side view.

FIG. 1 shows sections of an assembly 1 comprising and/or consisting of a first component 2 and a second component 3.

Figure 2:
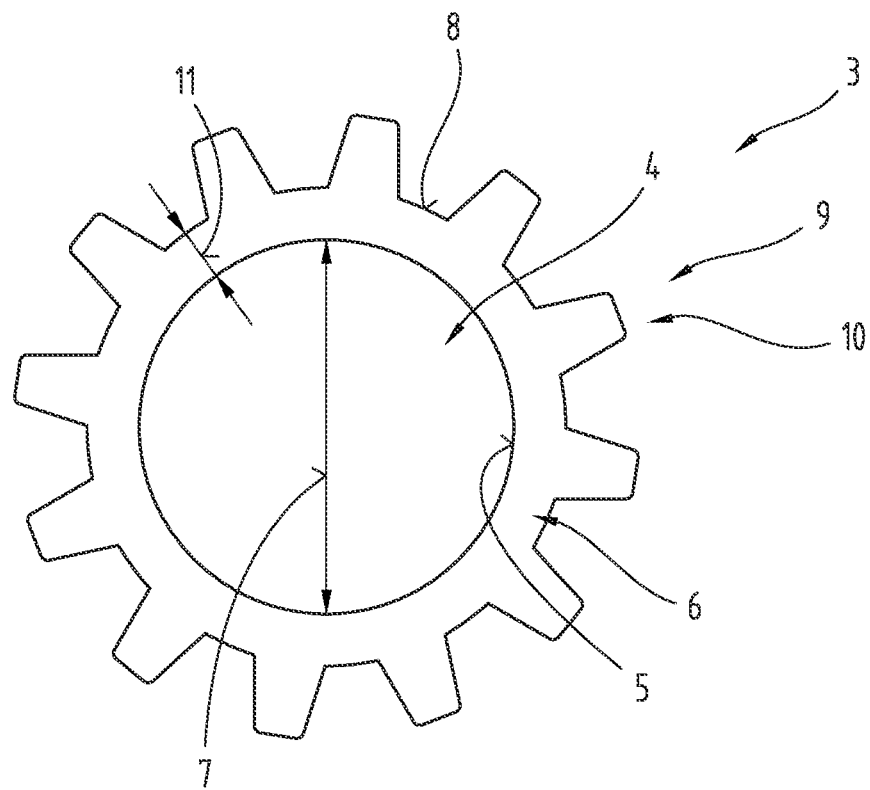
FIG. 2 shows a component in a front view.

The second component 3 has a recess 4, as can be seen better with the aid of the example for such a component 3 in FIG. 2. The recess 4 may be a blind hole. However, the recess 4 is preferably formed to go through the second component 3. The cross-sectional shape of the recess 4 is adapted to the cross-sectional shape of the first component 2. Hence, if it has, for example, a circular cross-section, the recess 4, too, is formed to have a circular cross-section (within the production-related tolerances).

The recess 4 serves to accommodate the first component 2 and/or a part of the first component 2. As can be seen from FIG. 1, the first component 2 may extend through said recess 4. However, it may also just be inserted into the recess 4. Via the recess 4, i.e. its lateral surface 5, a press fit connection is formed with the first component 2.

The first component 2 may be, for example, a shaft, an axle, a pin, etc. As already mentioned above, the first component 2 may have a circular cross-section. However, the first component 2 may also have a different cross-sectional shape, for example a polygonal one, such as a quadrangular or hexagonal or octagonal, etc.

Moreover, the first component 2 may be designed as a hollow component, for example as a hollow shaft, or as a solid component without a hollow space (at least in the region of the second component 3).

The first component 2 is made from a metal and consists, for example, of a steel, of brass, of an aluminum alloy, etc.

The second component 3 has an annular component section 6 and/or consists thereof. This annular component section 6 surrounds the recess 4 and/or forms the lateral surface 5, which bounds the recess 4. The second component 3 may, for example, be a hollow cylinder, a gear, such as a sprocket or a timing belt wheel, etc.

The second component 3 is preferably formed as one piece but can also be formed in multiple pieces.

The annular component section 6, in particular, but preferably the entire second component 3, consists of a metallic material, for example of a steel, of brass, of an aluminum alloy, etc. However, the component 3 may also, at least partially, for example the toothing, or entirely be formed of and/or consist of a polymer.

The annular component section 6, in particular, but preferably the entire second component 3, is a sintered component, meaning produced using a powder-metallurgical method. As these methods are generally known, further explanations in this regard may be dispensed with. It should only be mentioned that a powder-metallurgical method comprises compressing a metallic powder to form a green compact, sintering the green compact (in one or multiple steps) as well as possibly post-processing the sintered component 3, for example by hardening. However, it is provided that at least the annular component section 6 of the second component 3 is a net shape or a near net shape sintered component and/or is produced to have net shape or near net shape quality at least in the region of the recess 4. Hence, in contrast to what is common in the prior art for forming a press fit connection, the lateral surface 5 of the annular component section 6 is not mechanically post-processed on an inner diameter D 7 after sintering in order to thus reduce the tolerances. In other words, the annular component section 6 already has its final dimension of the inner diameter D 7 for forming the press fit connection with the first component 2 immediately after sintering and cooling down to room temperature. These final dimensions are already created in the pressing mold, possibly taking into account the dimension changes possibly occurring during sintering due to shrinking or component growth (depending on the alloy used).

The press fit connection itself may be established according to the prior art by pressing the second component 3 onto the first component 2. For this purpose, the first component 2 may possibly be cooled or the second component 3 may possibly be heated.

As already explained, it may be provided according to a preferred embodiment variant that the second component 3 is a gear. As a stand-in for possible embodiment variants of gears, FIG. 2 shows such a gear. On an outer lateral surface 8 of the annular component section 6, this gear has an external toothing 9 with teeth 10.

The external toothing may generally be designed differently, for example as a toothing for meshing with a timing belt or a chain or the with toothing of a further gear.

The annular component section 6 has a radial wall thickness W 11 and/or is produced with it. According to a different embodiment variant of the invention, it may be provided that the radial wall thickness W 11 is produced and/or formed such that a ratio of the radial wall thickness W 11 to the inner diameter 7 of the annular component section 6 is less than 1:2. In particular, this ratio of W/D can be selected from a range of 1/2 to 1/15, preferably from a range of 1/5 to 1/15.

FIG. 3 shows a further embodiment variant of the second component 3, which again is designed as a gear with an external toothing 9 but may also have a different design.

In this embodiment variant, it is provided that the annular component section 6 is formed having a chamfer 12 on the circumference of the recess 4 at the transition between the inner lateral surface 5 bounding the recess 4 and an end face 13 of the annular component section 6.

In an embodiment variant, shown in FIG. 3, of the second component 3, it has such a chamfer 12 on both sides (when viewed in an axial direction 14). However, it is also possible that the annular component section 6 has the chamfer 12 at only one transition between the inner lateral surface 5 bounding the recess 4 and one of the two end faces 13.

The chamfer(s) 12 preferably extend along the entire circumference of the inner lateral surface 5.

If two chamfers 12 are formed, both chamfers 12 are preferably formed equally. However, they may also be formed differently from one another.

The chamfer(s) 12 may run as a simple cant and planarly. However, they may also have a rounded shape, wherein the curvature may possibly have multiple different radii when viewed in the axial direction 14.

According to an embodiment variant in this regard, it may be provided that the chamfer(s) 12 is (are) formed with an angle 15 to the inner lateral surface 5 bounding the recess of the annular component section, which angle 15 is selected from a range of 170° to 178°. For example, this angle may be between 175° and 177°.

A width 16 of the chamfered region in the axial direction 14 may be selected from a region between 0.2% and 10% of a total width 17 of the annular component section 6.

According to a further embodiment variant of the invention, it may be provided that the sintered part (the annular component section 6) is produced having pores with an average pore size in the range of 5 µm to 200 µm. Moreover, the sintered component may have a porosity of between 1% and 15% (according to DIN 30 911-T3).

FIG. 4 shows a tooth 10 of the external toothing 9 (see FIG. 2). FIG. 4 is meant to illustrate a further embodiment variant of the invention. According to an embodiment variant, it is possible that the external toothing 9 makes allowance for the average expansion of a tooth root chord 17. The gear comprising the annular component section 6, which has the outer lateral surface 5 on which an external toothing 9 is formed (shown in FIG. 2) thus has an external toothing 9, on which the teeth 10 make allowance for the average expansion of the tooth root chord 17. This standing out is achieved by shifting the base circle of the toothing (according to ISO 6336).

The shifting of the base circle amounts to 55% to 90% of the average overlap in the direction of the gear center. In this regard, the average overlap is the difference of dw−d, wherein dw is the diameter of the shaft and d is the inner diameter 7 of the component 3.

In this regard, shifting means that the diameter of the base circle decreases by this value.

In this regard, the base circle is the circle with the diameter, at which the tooth flanks of two contacting gears do not touch and thus, no transmission of force takes place.

The shifting of the base circle db of the toothing results in a tip circle (tip circle da) and root circle (root circle df) shift with the same extent.

When pushing the gear on, the tip circle increases, tooth gaps are also possibly widened. Due to the standing out, this change in geometry can be handled better.

The exemplary embodiments show possible embodiment variants, while it should be noted at this point that combinations of the individual embodiment variants are also possible.

Finally, as a matter of form, it should be noted that, for better understanding, the figures are not necessarily depicted to scale.

Although only a few embodiments of the present invention have been shown and described, it is to be understood that many changes and modifications may be made thereunto without departing from the spirit and scope of the invention.

LIST OF REFERENCE NUMBERS

1 Assembly
2 Component
3 Component
4 Recess
5 Lateral surface
6 Component section
7 Inner diameter
8 Lateral surface
9 External toothing
10 Tooth
11 Wall thickness
12 Chamfer
13 End face
14 Axial direction
15 Angle
16 Width
17 Tooth root chord

What is claimed is:

1. A method for connecting a first component to a second component to form an assembly, comprising:
producing the first component as a shaft;
defining a diameter of a base circle of an external toothing;
shifting the diameter of the base circle of the external toothing by 55% to 90% of an average overlap in a direction of a gear center to form a shifted diameter of the base circle;
creating a pressing mold for producing a sintered gear with the shifted diameter of the base circle;
producing the second component as the sintered gear having an annular component section in which a recess is formed and for which the external toothing is formed on an outer lateral surface of the annular component section;
forming a press fit connection between the first component and the second component, wherein the first component is at least partially arranged in the recess;

wherein at least the annular component section of the second component has net shape or near net shape quality at least in a region of the recess;
wherein the base circle is a circle having a diameter at which tooth flanks of two contacting gears do not touch and no transmission of force takes place, and
wherein the average overlap is determined by the formula:

$$dw-d$$

where dw is a diameter of the shaft and d is an inner diameter of the second component.

2. The method according to claim 1,
wherein the annular component section is produced having a radial wall thickness W,
wherein the recess is produced having a circular cross-section and a recess inner diameter D,
wherein the radial wall thickness W is produced such that a ratio of W/D<1/2 is present.

3. The method according to claim 1, wherein the annular component section is formed having a chamfer on a circumference of the recess at a transition between an inner lateral surface bounding the recess and an end face of the annular component section.

4. The method according to claim 3, wherein the chamfer is formed with an angle to the inner lateral surface bounding the recess of the annular component section, which angle is selected from a range of 170° to 178°.

5. The method according to claim 1, wherein the sintered gear is produced having pores with an average pore size in a range of 5 μm to 200 μm.

6. The method according to claim 2, wherein the ratio of W/D is between 1/5 and 1/15.

* * * * *